US012263685B2

(12) United States Patent
Murakami et al.

(10) Patent No.: US 12,263,685 B2
(45) Date of Patent: Apr. 1, 2025

(54) PRINTING APPARATUS, PRINTING METHOD, AND COMPUTER READABLE MEDIUM

(71) Applicant: BROTHER KOGYO KABUSHIKI KAISHA, Nagoya (JP)

(72) Inventors: Sachiko Murakami, Okazaki (JP); Akira Minami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 117 days.

(21) Appl. No.: 18/332,689

(22) Filed: Jun. 9, 2023

(65) Prior Publication Data

US 2023/0398792 A1 Dec. 14, 2023

(30) Foreign Application Priority Data

Jun. 10, 2022 (JP) ................................ 2022-094156

(51) Int. Cl.

| | |
|---|---|
| ***B41J 2/355*** | (2006.01) |
| ***B41J 2/32*** | (2006.01) |
| ***B41J 2/36*** | (2006.01) |
| ***B41J 29/38*** | (2006.01) |

(52) U.S. Cl.

CPC ............... *B41J 2/3558* (2013.01); *B41J 2/32* (2013.01); *B41J 2/355* (2013.01); *B41J 2/36* (2013.01); *B41J 29/38* (2013.01); *B41J 2202/31* (2013.01)

(58) Field of Classification Search

CPC ... B41J 2/3558; B41J 2/32; B41J 2/355; B41J 2/36; B41J 29/38; B41J 2202/31

See application file for complete search history.

(56) References Cited

U.S. PATENT DOCUMENTS

2013/0258028 A1* 10/2013 Matsutani ................ B41J 2/355 347/183
2019/0171142 A1* 6/2019 Takagi ............... G03G 15/2042

FOREIGN PATENT DOCUMENTS

JP H05301357 A * 11/1993 ................ B41J 2/32
JP H06293152 A * 10/1994 ................ B41J 2/36
JP 2013-208737 A 10/2013

* cited by examiner

*Primary Examiner* — Yaovi M Ameh

(74) *Attorney, Agent, or Firm* — KENEALY VAIDYA LLP

(57) ABSTRACT

A printing apparatus includes a thermal head in which a plurality of heating elements is arranged in a main scanning direction, a moving mechanism configured to relatively move a print medium with respect to the thermal head in a sub-scanning direction crossing the main scanning direction, a controller configured to control the thermal head and the moving mechanism, and a storage unit configured to store first print data in which pixels are arranged in the main scanning direction and the sub-scanning direction, the pixels including print pixels indicating pixels with which corresponding dots are formed on the print medium by heat generated by the heating elements and non-print pixels with which no dot is formed on the print medium, the first print data being for printing a first print image represented by the print pixels. The controller executes generation processing and control processing.

16 Claims, 13 Drawing Sheets

PRINTING APPARATUS, PRINTING METHOD, AND COMPUTER READABLE MEDIUM

REFERENCE TO RELATED APPLICATIONS

This application claims priority from Japanese Patent Application No. 2022-094156 filed on Jun. 10, 2020. The entire content of the priority application is incorporated herein by reference.

BACKGROUND ART

In a printing apparatus that performs printing using a thermal head, a technique for printing a print image having a high resolution by increasing the density of dots has been proposed. A printing apparatus in a related art performs printing using a thermal head including a heating body having a short length in a sub-scanning direction and using a control signal having a plurality of heating pulses in a printing cycle. Accordingly, the printing apparatus increases the density of the dots formed on a print medium in the sub-scanning direction.

DESCRIPTION

Even if the density of the dots formed in a print image in the sub-scanning direction is increased, there is a matter that the density of the dots in a main scanning direction is not increased.

An object of the present disclosure is to provide a printing apparatus, a printing method, and a printing program that are capable of printing a high-quality print image by easily increasing the density of dots formed on a print medium in a main scanning direction.

According to a first aspect of the disclosure, a printing apparatus includes a thermal head in which a plurality of heating elements is arranged in a main scanning direction, a moving mechanism configured to relatively move a print medium with respect to the thermal head in a sub-scanning direction crossing the main scanning direction, a controller configured to control the thermal head and the moving mechanism, and a storage unit configured to store first print data in which pixels are arranged in the main scanning direction and the sub-scanning direction, the pixels including print pixels indicating pixels with which corresponding dots are formed on the print medium by heat generated by the heating elements and non-print pixels with which no dot is formed on the print medium, the first print data being for printing a first print image represented by the print pixels. The controller is configured to execute generation processing of generating second print data based on the first print data stored in the storage unit. The generation processing includes extracting, from the non-print pixels, a target pixel to which one of the print pixels is adjacent on one side or the other side in the sub-scanning direction and to which one of the print pixels is adjacent on one side or the other side in the main scanning direction, generating n divided pixels by dividing the extracted target pixel into n in the main scanning direction, n being an integer equal to or greater than 2, identifying a second print image formed of the print pixels and at least one divided print pixel with which corresponding dot is formed on the print medium and chosen from the n divided pixels in order of closeness to one of the print pixels adjacent to the extracted target pixel in the main scanning direction, and generating the second print data for printing the second print image. The controller executes control processing of controlling the thermal head and the moving mechanism based on at least the second print data generated by the generation processing. The control processing includes setting, as a first value, a value of energy applied to the heating element in order to cause the heating element to generate heat at a position corresponding to one of the print pixels on the print medium, and setting, as a second value, a value of energy smaller than the first value and applied to the heating element in order to cause the heating element to generate heat at a position corresponding to the target pixel on the print medium.

According to the first aspect, since the density of the dots formed on the print medium in the main scanning direction may be increased, the printing apparatus may print a high-quality print image on the print medium.

In the first aspect, in the control processing, when n is equal, the second value may be made larger as the number of the divided print pixels is larger. In this case, the printing apparatus may appropriately form the dot at the position corresponding to the divided print pixel in the print medium.

In the first aspect, in the control processing, when the number of the divided print pixels is equal, the second value may be made smaller as n is larger. In this case, the printing apparatus may appropriately form the dot at the position corresponding to the divided print pixel in the print medium.

In the first aspect, the control processing may further include, based on the second print data, setting, as the first value, a value of energy applied to the heating element in order to cause the heating element to generate heat at a position where the print pixel in the second print image is provided in the print medium, and setting, as the second value, a value of energy applied to the heating element in order to cause the heating element to generate heat at a position where the target pixel including the divided print pixel in the second print image is provided in the print medium. In this case, the printing apparatus may easily distinguish the positions corresponding to the target pixels, apply the energy of the second value to the heating element, and form the dot at the position corresponding to the divided print pixel.

In the first aspect, the control processing may further include, based on the first print data and the second print data, setting, as the first value, a value of energy applied to the heating element in order to cause the heating element to generate heat at a position where the first print image and the second print image are provided in the print medium, and setting, as the second value, a value of energy applied to the heating element in order to cause the heating element to generate heat at a position where only the second print image is provided in the print medium. In this case, the printing apparatus may easily distinguish the positions corresponding to the target pixels, apply the energy of the second value to the heating element, and form the dot at the position corresponding to the divided print pixel.

In the first aspect, the pixel of the first print data may be generated by dividing an original pixel having the same length in the main scanning direction and the sub-scanning direction into m (m is an integer equal to or greater than 2) in the sub-scanning direction, and a length in the sub-scanning direction may be 1/m of a length in the main scanning direction. In this case, since the printing apparatus may increase the dot density not only in the main scanning direction but also in the sub-scanning direction, a high-quality print image with higher resolution may be printed on the print medium.

In the first aspect, n may be 2. In this case, the printing apparatus may increase the dot density while preventing an increase in processing load of the controller.

In the first aspect, the heating element may include two heating bodies configured to form one dot on the print medium by heat generation and divided in the main scanning direction. That is, the printing apparatus causes the two heating bodies of the heating element to generate heat at the position corresponding to the target pixel. In this case, the position at which heat is applied from the two heating bodies in the print medium approaches the position corresponding to the print pixel adjacent to one side or the other side with respect to the target pixel in the main scanning direction. Therefore, the printing apparatus may easily form the dot at the position corresponding to the divided print pixel in the print medium.

In the first aspect, when energy equal to or greater than a predetermined value is applied to the heating element to generate heat, a dot may be formed on the print medium, and when energy less than the predetermined value is applied to the heating element to generate heat, no dot may be formed on the print medium, and the second value may be equal to or greater than the predetermined value. In this case, the printing apparatus may appropriately form the dot at the position corresponding to the divided print pixel.

In the first aspect, the controller may set, as the first value, a value of energy applied to the heating element in order to cause the heating element to generate heat at a position corresponding to a part of the print pixel in the print medium, and may set, as the second value, a value of energy applied to the heating element in order to cause the heating element to generate heat at a position corresponding to a part other than the part of the print pixel, thereby dividing, in the main scanning direction, a dot formed at the position corresponding to the part other than the part of the print pixel in the print medium. In this case, since the printing apparatus may increase the density of the dot formed at the position corresponding to the print pixel in the print medium in the main scanning direction, a high-quality print image with higher resolution may be printed on the print medium.

In the first aspect, the controller may shorten a cycle of the heating element generating heat by applying energy to the heating element, thereby dividing, in the sub-scanning direction, a dot formed on the print medium. In this case, since the printing apparatus may increase the dot density in the sub-scanning direction, a high-quality print image with higher resolution may be printed on the print medium.

According to a second aspect of the present disclosure, a printing method includes generating second print data based on first print data in which pixels are arranged in a main scanning direction and a sub-scanning direction crossing the main scanning direction, the pixel including print pixels indicating pixels with which corresponding dots are formed on a print medium by heat generated by a heating element of a thermal head in which a plurality of heating elements are arranged in the main scanning direction, the non-print pixels indicating pixels with which no dot is formed on the print medium, the first print data being for printing a first print image represented by the print pixels, controlling the thermal head and a moving mechanism, based on at least the second print data generated in the generating, configured to relatively move the print medium with respect to the thermal head in the sub-scanning direction. The generating includes extracting, from the non-print pixels, a target pixel to which one of the print pixels is adjacent on one side or the other side in the sub-scanning direction and to which one of the print pixels is adjacent on one side or the other side in the main scanning direction, generating n divided pixels by dividing the extracted target pixel into n in the main scanning direction, n being an integer equal to or greater than 2, identifying a second print image formed of the print pixels and at least one divided print pixel with which corresponding dot is formed on the print medium and chosen from the n divided pixels in order of closeness to one of the print pixels adjacent to the extracted target pixel in the main scanning direction, and generating the second print data for printing the second print image. The controlling includes setting, as a first value, a value of energy applied to the heating element in order to cause the heating element to generate heat at a position corresponding to one of the print pixels on the print medium, and setting, as a second value, a value of energy smaller than the first value and applied to the heating element in order to cause the heating element to generate heat at a position corresponding to the target pixel on the print medium. According to the second aspect, the same effects as those according to the first aspect may be achieved.

According a third aspect of the present disclosure, a non-transitory computer readable medium stores a program causing a computer to execute a process for performing printing on a print medium. The process includes generating second print data based on first print data in which pixels are arranged in a main scanning direction and a sub-scanning direction crossing the main scanning direction, the pixel including print pixels indicating pixels with which corresponding dots are formed on the print medium by heat generated by a heating element of a thermal head in which a plurality of heating elements are arranged in the main scanning direction, the non-print pixels indicating pixels with which no dot is formed on the print medium, the first print data being for printing a first print image represented by the print pixels, and controlling the thermal head and a moving mechanism, based on at least the second print data generated in the generating, configured to relatively move the print medium with respect to the thermal head in the sub-scanning direction. The generating includes extracting, from the non-print pixels, a target pixel to which one of the print pixels is adjacent on one side or the other side in the sub-scanning direction and to which one of the print pixels is adjacent on one side or the other side in the main scanning direction, generating n divided pixels by dividing the extracted target pixel into n in the main scanning direction, n being an integer equal to or greater than 2, identifying a second print image formed of the print pixels and at least one divided print pixel with which corresponding dot is formed on the print medium and chosen from the n divided pixels in order of closeness to one of the print pixels adjacent to the extracted target pixel in the main scanning direction, and generating the second print data for printing the second print image. The controlling includes setting, as a first value, a value of energy applied to the heating element in order to cause the heating element to generate heat at a position corresponding to one of the print pixels on the print medium, and setting, as a second value, a value of energy smaller than the first value and applied to the heating element in order to cause the heating element to generate heat at a position corresponding to the target pixel on the print medium. According to the third aspect, the same effects as those according to the first aspect may be achieved.

FIG. 1A is a perspective view of a printer 1 in a state in which a cover 3 is closed, and FIG. 1B is a perspective view of the printer 1 in a state in which the cover 3 is opened;

FIG. 2 is a plan view of a cassette mounting portion 8 in which a cassette 6 is mounted, omitting the illustration of a bottom surface of the cassette mounting portion 8.

OVERVIEW OF PRINTER 1

A printer 1 will be described with reference to FIGS. 1A, 1B, and 2. The printer 1 is a thermal type and thermal transfer type tape printing apparatus. As an example, a cassette 6 including a thermal tape M as a recording medium is mounted on the printer 1. The printer 1 performs printing by a thermal head 15 to be described later heating the thermal tape M while feeding and transporting the thermal tape M from the cassette 6.

Figure 1A:
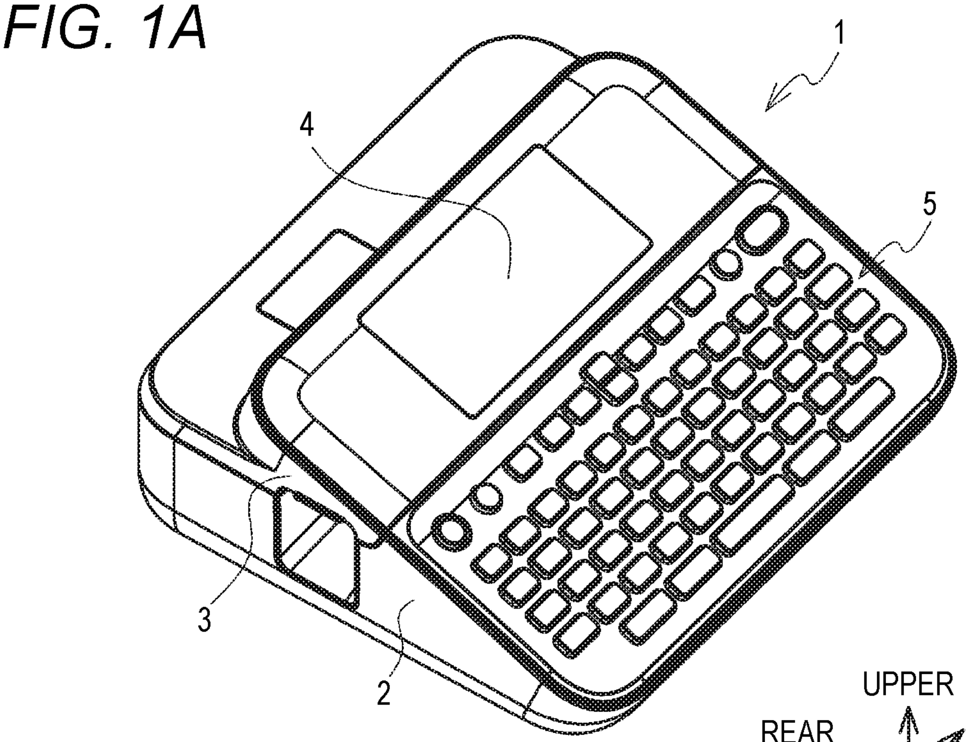
Figure 1A:
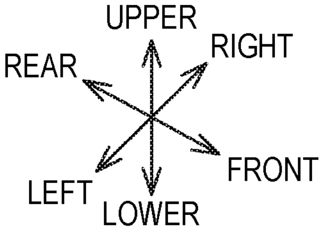
Figure 1B:
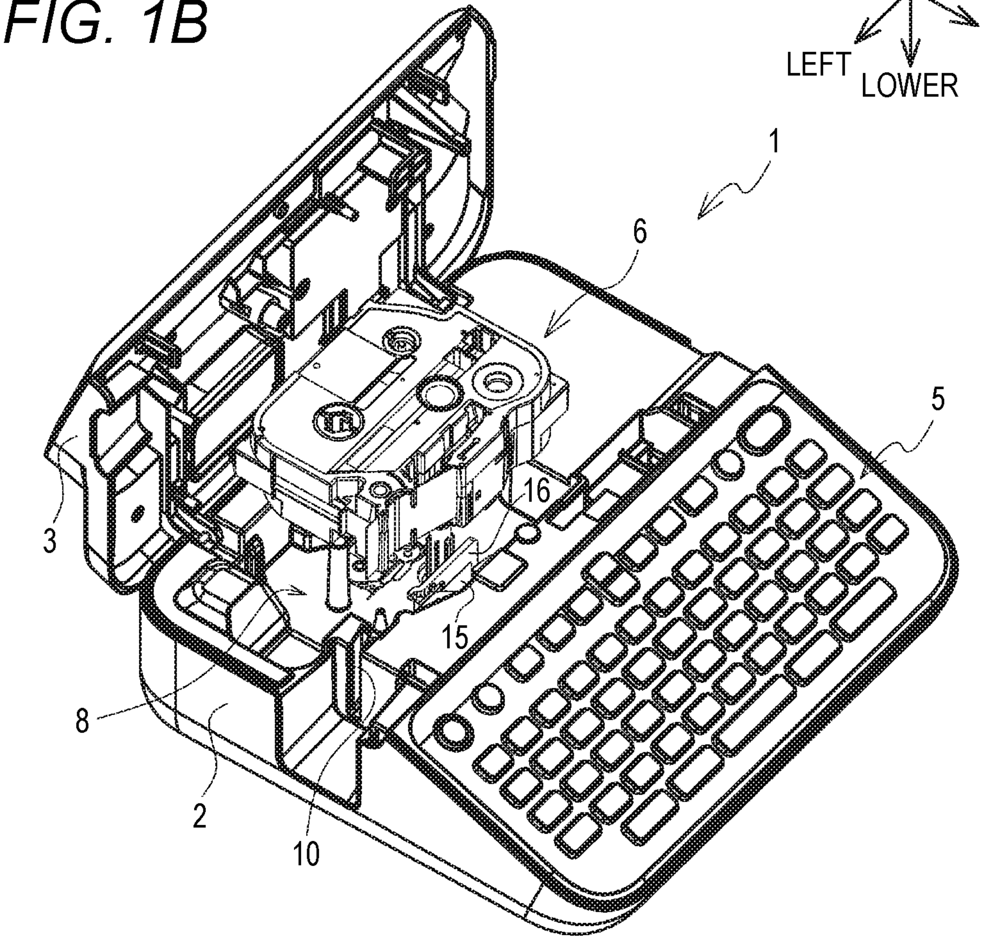

As shown in FIGS. 1A and 1B, the printer 1 includes a housing 2, a cover 3, a display unit 4, and an operation unit 5. The housing 2 has a substantially rectangular parallelepiped shape. A discharge slit 10 is formed on a left side surface of the housing 2. The discharge slit 10 is an opening extending in an upper-lower direction, and discharges the printed thermal tape M to the outside of the housing 2. The cover 3 is supported at a rear end portion of the housing 2 in a manner of being rotatable about a shaft extending in a left-right direction. FIG. 1A shows a state in which the cover 3 is closed with respect to the housing 2, and FIG. 1B shows a state in which the cover 3 is opened with respect to the housing 2. The cover 3 is opened and closed when, for example, the cassette 6 is replaced. In the following description, the configurations of members will be described based on the state in which the cover 3 is closed with respect to the housing 2.

As shown in FIG. 1A, the display unit 4 is provided on an upper surface of the cover 3. The display unit 4 is, for example, a liquid crystal display, and may display various types of information. The operation unit 5 is provided in front of the cover 3 and at a front portion of an upper surface of the housing 2. The operation unit 5 is operated when various instructions are input to the printer 1.

Figure 2:
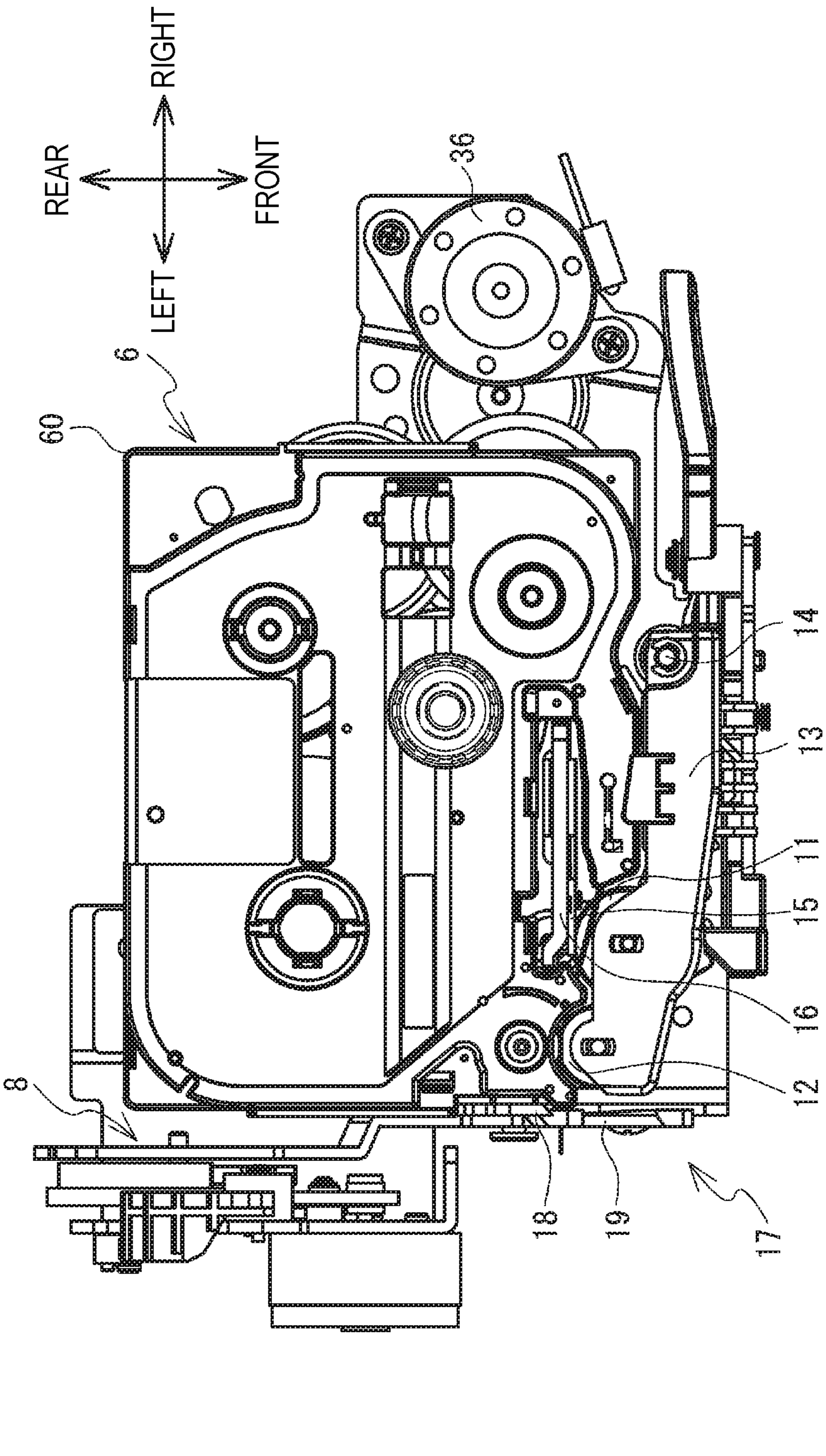

As shown in FIG. 1B and FIG. 2, the printer 1 includes, in a space surrounded by the housing 2 and the cover 3, a cassette mounting portion 8, a head holder 16, the thermal head 15, a platen holder 13, a platen roller 11, a transport roller 12, a motor 36, and a cutting mechanism 17.

The cassette mounting portion 8 is a recess recessed downward on which the cassette 6 may be mounted. The head holder 16 is in the form of a metal plate provided at a front portion of the cassette mounting portion 8. The thermal head 15 is mounted on a front surface of the head holder 16.

The platen holder 13 has an arm shape and is provided in front of the head holder 16. A right end portion of the platen holder 13 is pivotally supported in a manner of being pivotable about a shaft 14 extending in the upper-lower direction. The platen roller 11 and the transport roller 12 are pivotally supported at a left end portion of the platen holder 13 in a manner of being pivotable about a shaft extending in the upper-lower direction. The platen roller 11 faces the thermal head 15, and may be brought into contact with and separated from the thermal head 15. The transport roller 12 is located on a left side of the platen roller 11. The transport roller 12 may be brought into contact with and separated from a transport roller (not shown) provided in the cassette 6. The platen holder 13 swings between a standby position and a printing position in conjunction with the opening and closing of the cover 3. The printing position is a position where the platen holder 13 is close to the cassette mounting portion 8.

When the cover 3 is opened, the platen holder 13 moves from the printing position to the standby position. The standby position is a position where the platen holder 13 is separated from the cassette mounting portion 8. When the platen holder 13 is at the standby position, the user may attach and detach the cassette 6 to and from the cassette mounting portion 8. When the cover 3 is closed, the platen holder 13 swings from the standby position toward the printing position. When the cassette 6 is mounted on the cassette mounting portion 8, the platen roller 11 presses the thermal tape M against the thermal head 15. The transport roller 12 sandwiches the thermal tape M between the transport roller 12 and the transport roller of the cassette 6.

The motor 36 is a stepping motor. A rotational driving force of the motor 36 is transmitted to the platen roller 11 and the transport roller 12. When the motor 36 is driven in a state in which the cassette 6 is mounted on the cassette mounting portion 8, the platen roller 11 and the transport roller 12 rotate in a counterclockwise direction in a plan view.

The cutting mechanism 17 is provided on a left side of the cassette mounting portion 8 and on a right side of the discharge slit 10 (see FIG. 1B). The cutting mechanism 17 cuts the thermal tape M discharged from the cassette 6. The cutting mechanism 17 includes a fixed blade 18 and a movable blade 19 that are formed of metal. The movable blade 19 faces the fixed blade 18 and is movable with respect to the fixed blade 18.

Thermal Head 15

Figure 3:
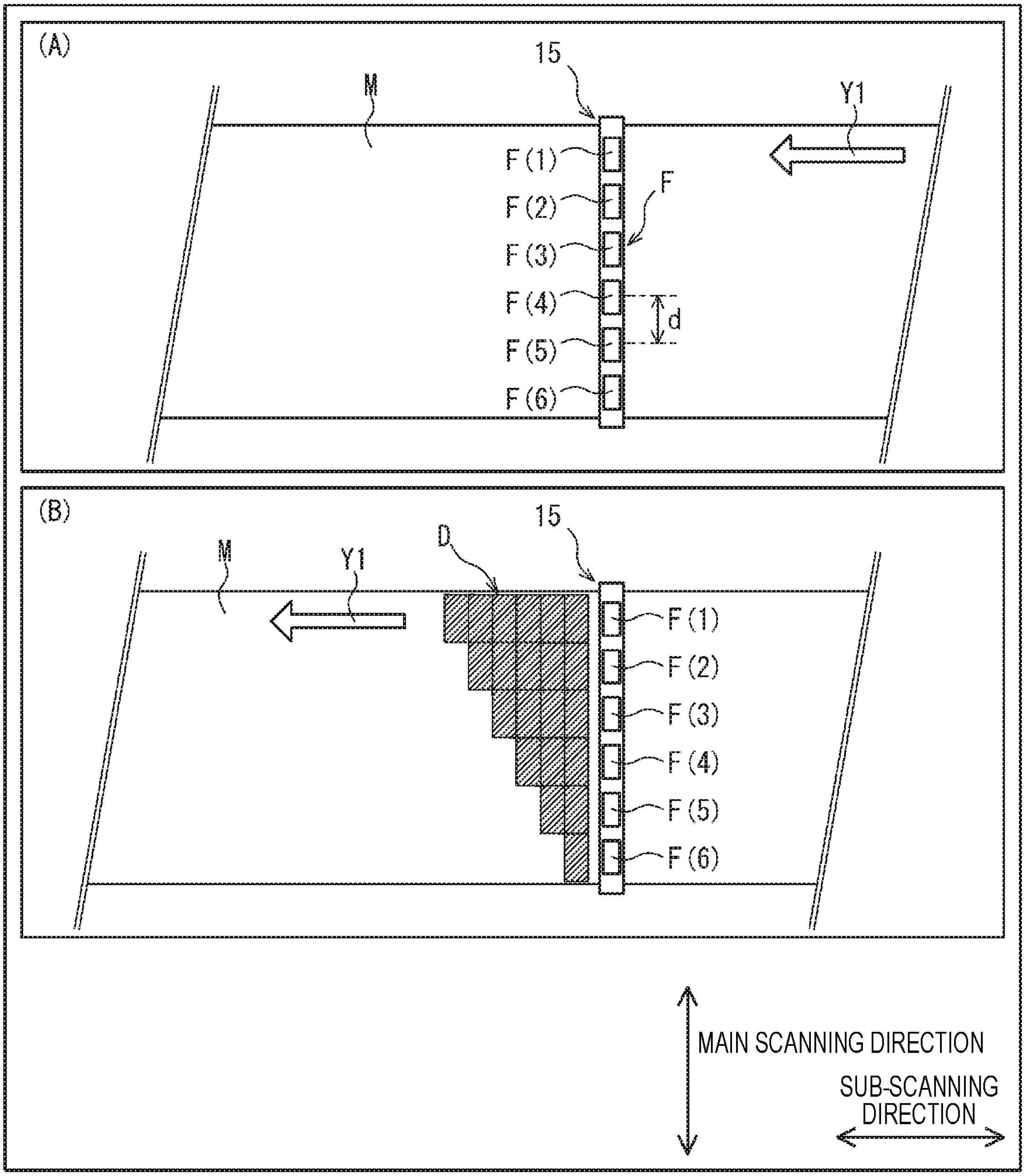
FIG. 3 illustrate how dots D are printed on a thermal tape M.
Figure 4:
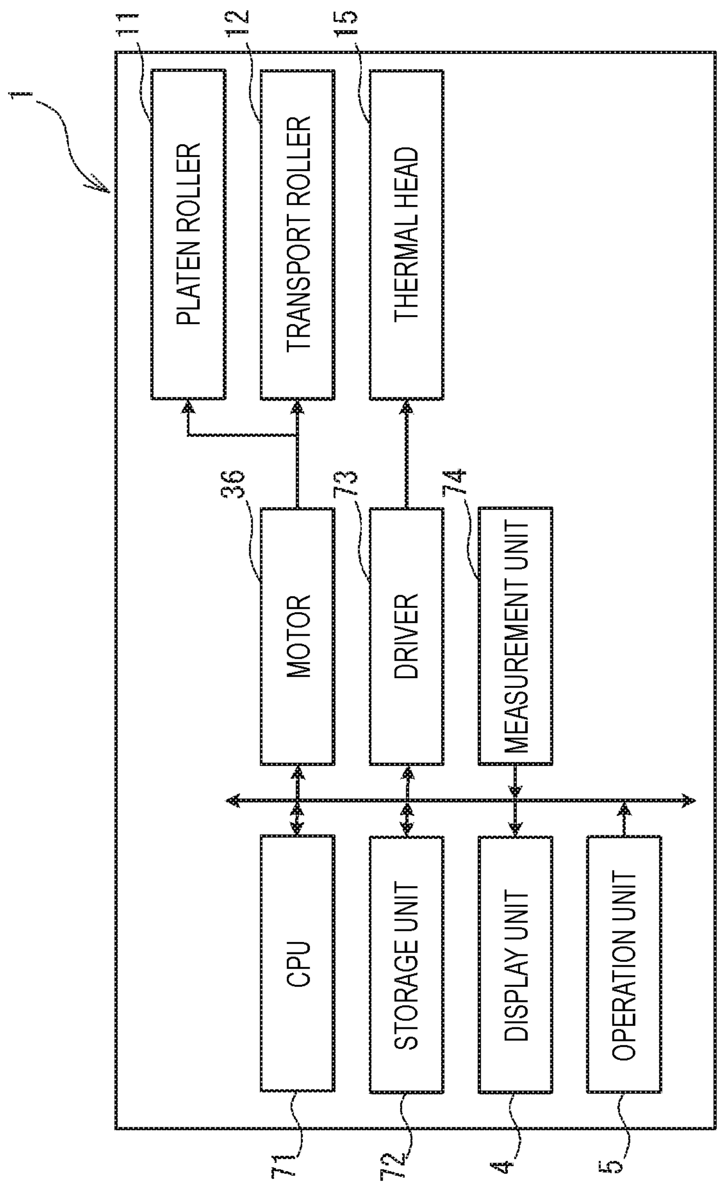
FIG. 4 is a block diagram showing an electrical configuration of the printer 1.

As shown in (A) of FIG. 3, the thermal head 15 includes heating elements F (F(1) to F(6)). The heating elements F(1) to F(6) are arranged at equal intervals in a direction orthogonal to a transport direction (a direction of an arrow Y1) of the thermal tape M transported by the platen roller 11 and the transport roller 12. (A) of FIG. 3 shows a case in which the number of the heating elements F is six in order to facilitate the description. In practice, more heating elements F are provided in the thermal head 15. The direction in which the plurality of heating elements F are arranged is referred to as a “main scanning direction”. A direction perpendicular to the main scanning direction, that is, a direction parallel to the transport direction of the thermal tape M is referred to as a "sub-scanning direction". The interval between the adjacent heating elements F is denoted by d.

Overview of Printing Operation

The printer 1 feeds the thermal tape M from the cassette 6 and transports the thermal tape M toward the discharge slit 10. The thermal tape M is pressed against the thermal head 15 by the platen roller 11 while passing between the thermal head 15 and the platen roller 11. In this state, the printer 1 selectively applies a voltage to the heating element F of the thermal head 15. Electric power is supplied to the heating element F to which a voltage is applied in response to a current flowing due to the application of the voltage. The heating element F generates heat by being supplied with electric power. The heating element F that has generated heat applies energy to the thermal tape M.

When the heating element F of the thermal head 15 is supplied with electric power equal to or greater than a predetermined value Th and the heating element F generates heat, a part of the thermal tape M heated by the heating element F that has generated heat develops color. Accordingly, a plurality of dots D aligned in the main scanning direction are formed on the thermal tape M. In the thermal tape M, when the heating element F of the thermal head 15 is supplied with electric power less than the predetermined value Th and the heating element F generates heat, the part of the thermal tape M heated by the heating element F that has generated heat does not develop color, and the plurality of dots D are not formed on the thermal tape M.

The printer 1 periodically repeats the supply of electric power to the heating element F of the thermal head 15 while transporting the thermal tape M. Accordingly, as shown in (B) of FIG. 3, a print image formed by the plurality of dots D arranged in the main scanning direction and the sub-scanning direction is printed on the thermal tape M.

Here, a cycle when electric power is repeatedly supplied to the heating element F such that a distance between the plurality of dots D in the sub-scanning direction matches an interval d between the heating elements F is denoted by t. On the other hand, the printer 1 sets a cycle of supplying electric power to the heating element F to t/2. Accordingly, as shown in (B) of FIG. 3, the printer 1 increases the dot density of the print image in the sub-scanning direction. In the present embodiment, by executing main processing to be described later, it is possible to increase not only the dot density in the sub-scanning direction but also the dot density in the main scanning direction. The details will be described later.

The method for increasing the dot density of the print image in the sub-scanning direction is not limited to the above-described method. For example, the printer 1 may increase the dot density of the print image in the sub-scanning direction by reducing a transport speed of the thermal tape M and performing printing.

The printed thermal tape M is transported by the platen roller 11 and the transport roller 12, which are rotated by the driving of the motor 36, and is discharged to the outside of the printer 1 through the discharge slit 10.

Electrical Configuration

The electrical configuration of the printer 1 will be described with reference to FIG. 3. The printer 1 includes a CPU 71 that controls the printer 1 in general. The CPU 71 is electrically connected to a storage unit 72, the display unit 4, the operation unit 5, the motor 36, a driver 73, and a measurement unit 74. The storage unit 72 stores a program executed by the CPU 71, first print data and second print data to be described later, and the like. Various types of information are displayed on the display unit 4 according to a signal output from the CPU 71. A signal indicating an input operation executed on the operation unit 5 is output from the operation unit 5 to the CPU 71. The CPU 71 may detect an input operation executed on the operation unit 5 by detecting the signal output from the operation unit 5.

The motor 36 is driven according to a signal output from the CPU 71 to rotate the platen roller 11 and the transport roller 12. The driver 73 supplies electric power to the heating element F of the thermal head 15 according to the signal output from the CPU 71. The measurement unit 74 measures the electric power supplied to the thermal head 15, and outputs a signal indicating the measured electric power to the CPU 71. The CPU 71 may detect the electric power actually supplied to the heating element F of the thermal head 15 based on the signal output from the measurement unit 74.

First Print Data W1

Figure 5:
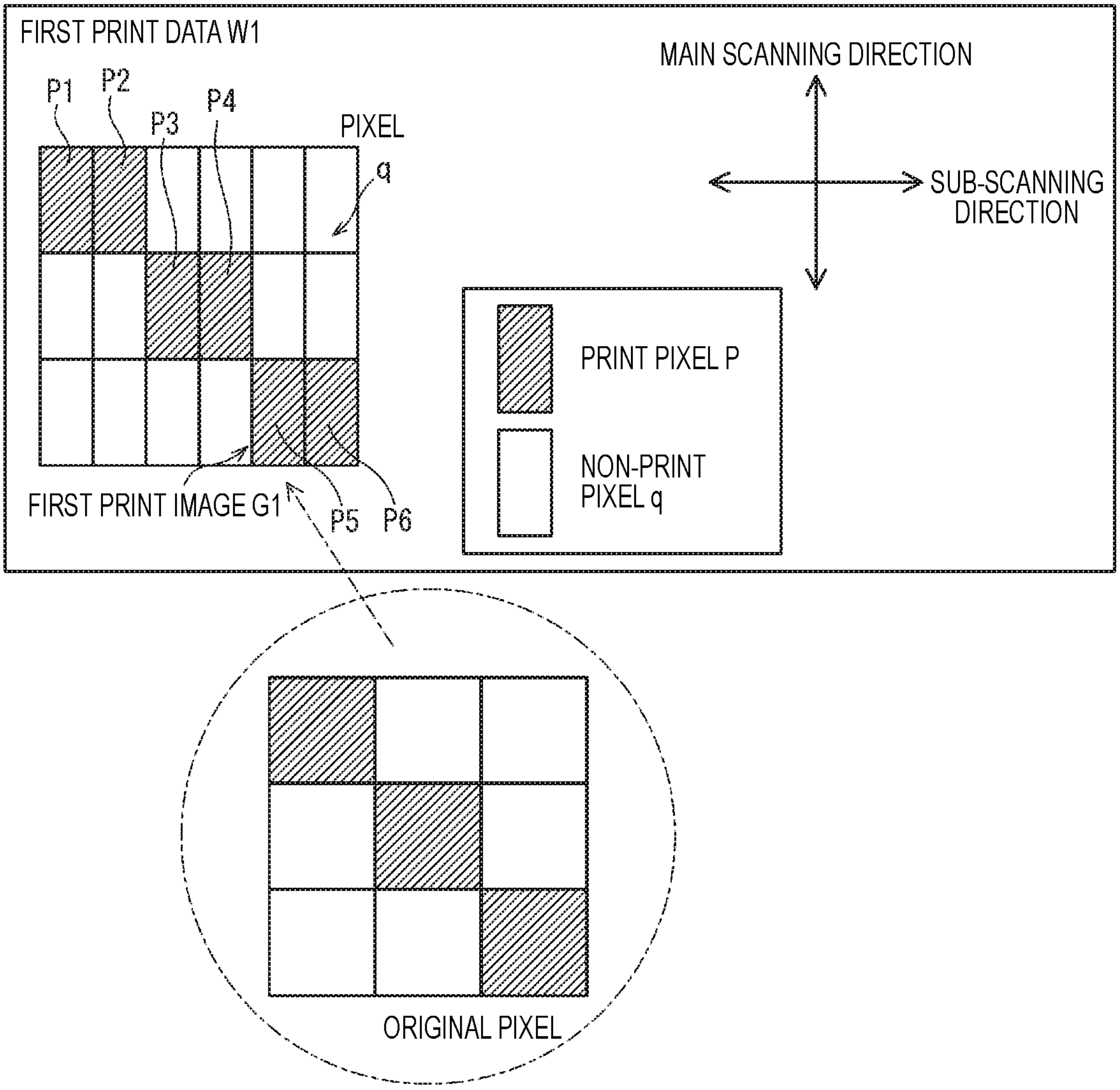
FIG. 5 is a diagram showing first print data W1.

First print data W1, which is an example of the first print data, will be described with reference to FIG. 5. The first print data W1 defines a plurality of pixels arranged in a grid pattern in the main scanning direction and the sub-scanning direction. In FIG. 5, in order to facilitate the description, pixels arranged in three rows in the main scanning direction and six rows in the sub-scanning direction are shown. In practice, more pixels are defined by the first print data W1.

Further, in the first print data W1, a print pixel P (P1, P2, P3, P4, P5, P6) or a non-print pixel q is set. The print pixel P is a pixel in which a dot is formed by heat generated by the heating element F. The non-print pixel q is a pixel in which no dot is formed. The printer 1 may print a print image (hereinafter referred to as "first print image G1") represented by the print pixel P of the first print data W1 on the thermal tape M by being driven based on the first print data W1.

As described above, the printer 1 increases the dot density in the sub-scanning direction by setting the cycle of supplying electric power to the heating element F to t/2. Therefore, the length of each pixel in the first print data W1 in the sub-scanning direction is ½ of the length in the main scanning direction. That is, the pixels of the first print data W1 are generated by dividing an original pixel having the same length in the main scanning direction and the sub-scanning direction into two in the sub-scanning direction.

Second Print Data W2

Figure 6:
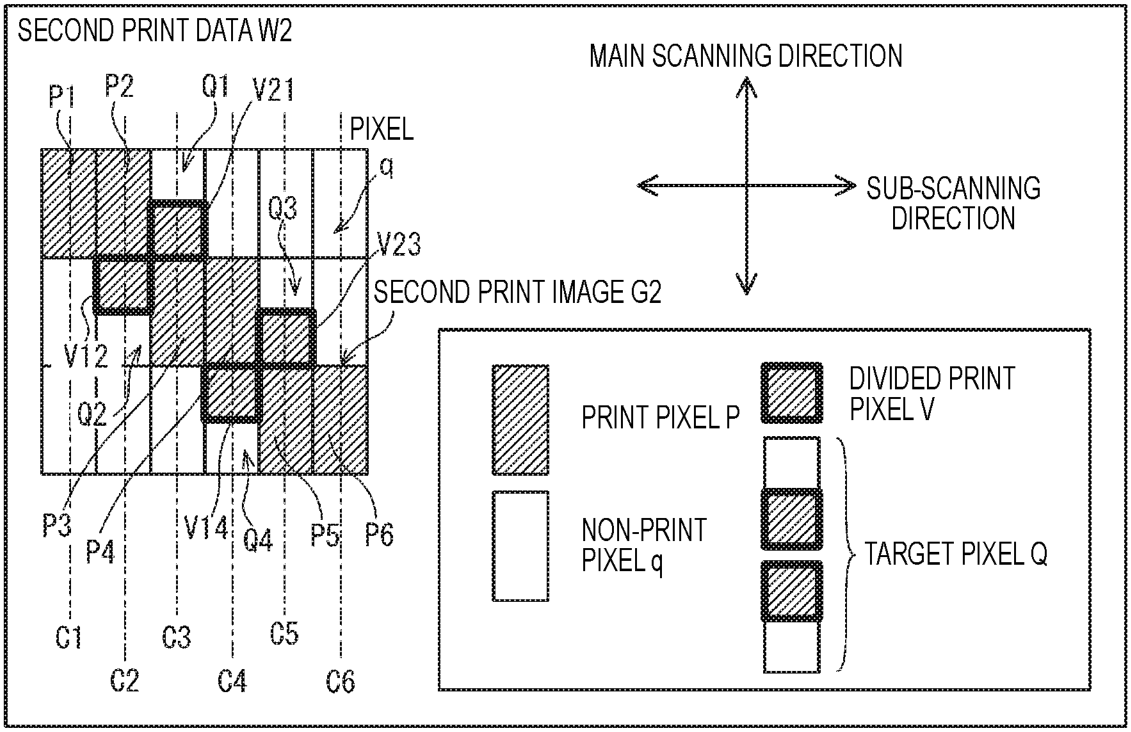
FIG. 6 is a diagram showing second print data W2.

Second print data W2, which is an example of the second print data, will be described with reference to FIG. 6. The second print data W2 is print data for printing second print image G2 in which the dot density in the main scanning direction is increased with respect to the first print image G1. In the second print image G2, jaggies seen in an outline portion of the first print image G1 (see FIG. 5) are smoothed. The second print data W2 is generated based on the first print data W1 by the main processing (see FIG. 7) to be described later.

The second print image G2 is a print image represented by the print pixel P and divided print pixels V21, V12, V23, V14 (hereinafter referred to as "divided print pixel V). That is, the second print image G2 is a print image obtained by adding the divided print pixel V to the first print image G1 represented by the print pixel P. The divided print pixel V has a shape obtained by dividing the pixel into two in the main scanning direction. The length of the divided print pixel V in the main scanning direction and the length of the divided print pixel V in the sub-scanning direction are the same.

Hereinafter, a pixel including the divided print pixel V will be referred to as a "target pixel Q". The target pixel Q including the divided print pixel V21 is referred to as a "target pixel Q1". The target pixel Q including the divided print pixel V12 is referred to as a "target pixel Q2". The target pixel Q including the divided print pixel V23 is referred to as a "target pixel Q3". The target pixel Q including the divided print pixel V14 is referred to as a "target pixel Q4". A row of pixels arranged in the main scanning direction is referred to as a "row C". The row C including the print pixel P1 is referred to as a "row C1". The row C including the print pixel P2, the target pixel Q2, and the divided print pixel V12 is referred to as a "row C2". The row C including the print pixel P3, the target pixel Q1, and the divided print pixel V21 is referred to as a "row C3". The row C including the print pixel P4, the target pixel Q4, and the divided print pixel V14 is referred to as a "row C4". The row C including the print pixel P5, the target pixel Q3, and the divided print pixel V23 is referred to as a "row C5". The row C including the print pixel P6 is referred to as a "row C6".

Main Processing

The main processing will be described with reference to FIG. 7. When the CPU 71 detects an input operation for starting printing via the operation unit 5, the CPU 71 reads and executes the program stored in the storage unit 72, thereby starting the main processing.

The CPU 71 reads and acquires the first print data stored in the storage unit 72 (S11). Hereinafter, a case in which the first print data W1 shown in FIG. 5 is acquired will be described in detail as an example. The CPU 71 identifies the first print image G1 represented by the print pixel P (P1, P2, P3, P4, P5, P6) based on the acquired first print data W1 (S13). The CPU 71 extracts the target pixel Q (see FIG. 6) based on the identified first print image G1 (S15). The CPU 71 extracts the non-print pixel q satisfying any one of the following four conditions as the target pixel Q.

Figure 8:
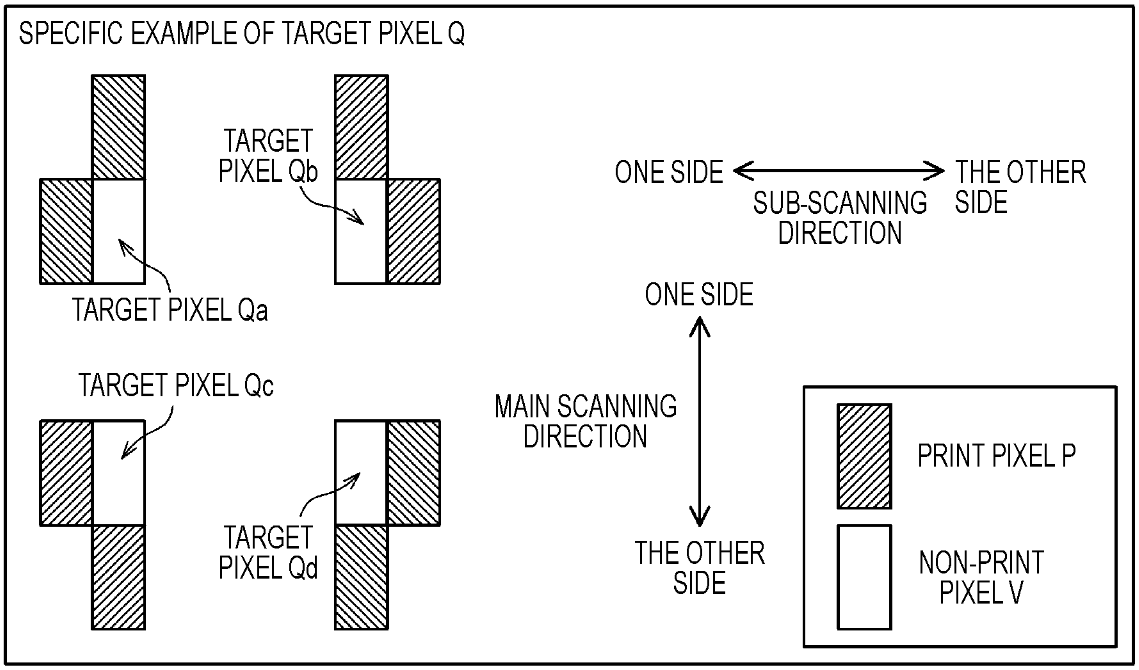
FIG. 8 is a diagram showing a specific example of a target pixel Q.

Condition 1: The print pixel P is adjacent on one side in the sub-scanning direction, and the print pixel P is adjacent on one side in the main scanning direction (for example, a target pixel Qa in FIG. 8).

Condition 2: The print pixel P is adjacent on the other side in the sub-scanning direction, and the print pixel P is adjacent on the one side in the main scanning direction (for example, a target pixel Qb in FIG. 8)

Condition 3: The print pixel P is adjacent on the one side in the sub-scanning direction, and the print pixel P is adjacent on the other side in the main scanning direction (for example, a target pixel Qc in FIG. 8)

Condition 4: The print pixel P is adjacent on the other side in the sub-scanning direction, and the print pixel P is adjacent on the other side in the main scanning direction (for example, a target pixel Qd in FIG. 8)

Figure 9:
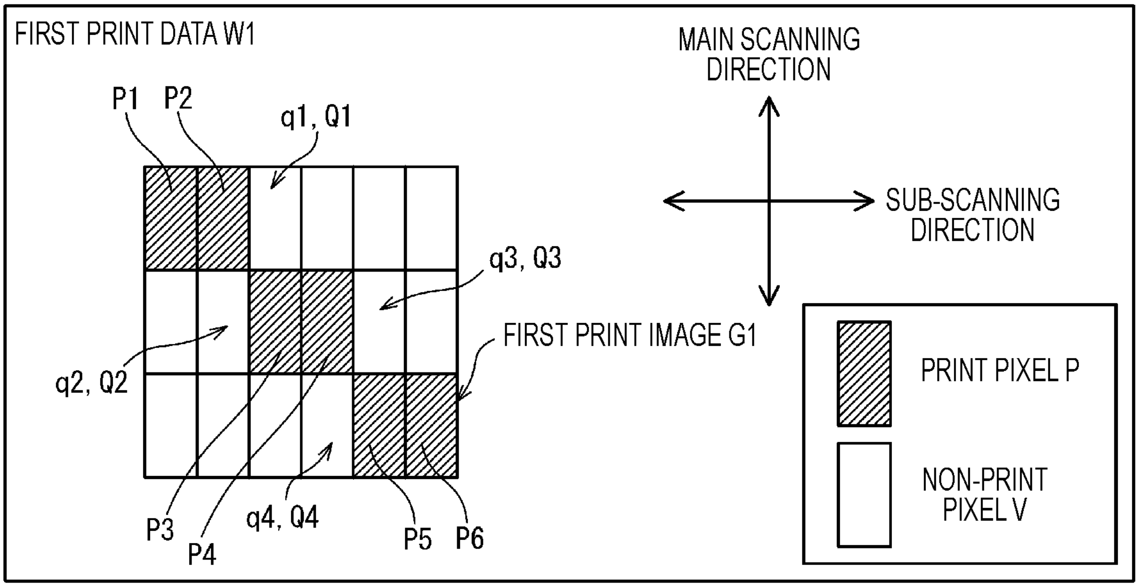
FIG. 9 is a diagram showing how the target pixel Q is extracted from the first print data W1.

Since the first print data W1 is acquired in S11, the non-print pixels q1, q2, q3, q4 shown in FIG. 9 are extracted as the target pixels Q1, Q2, Q3, Q4, respectively.

Figure 7:
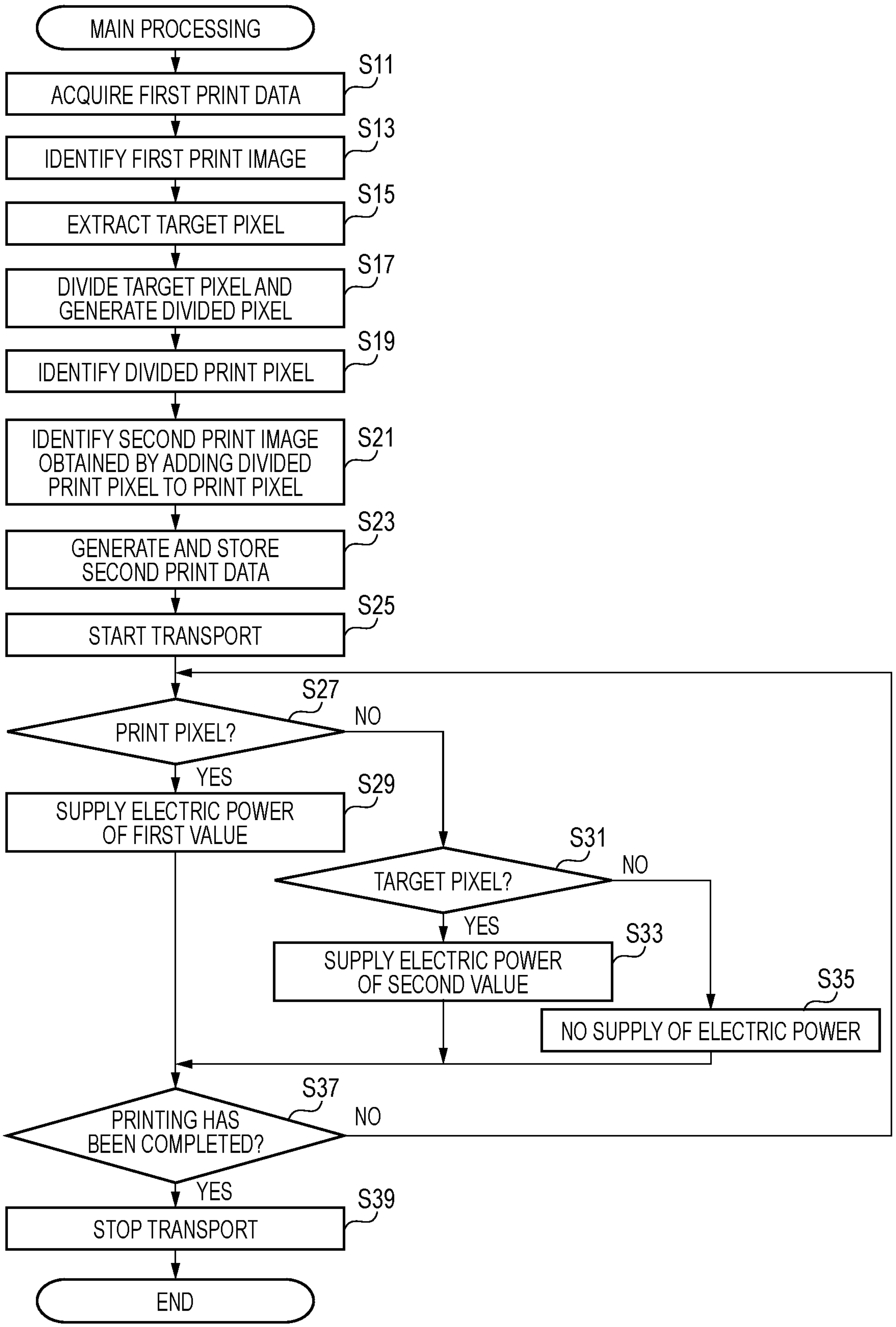
FIG. 7 is a flowchart of main processing.

As shown in FIG. 7, next, the CPU 71 divides the target pixels Q1, Q2, Q3, Q4 extracted in S15 into two in the main scanning direction to generate divided pixels v (S17).

Figure 10:
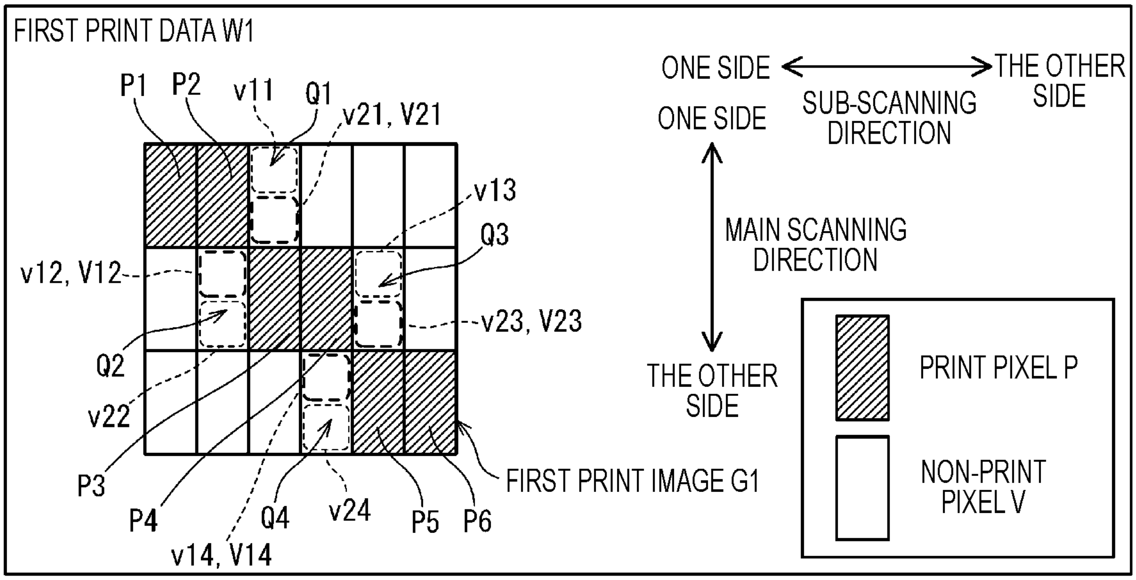
FIG. 10 is a diagram showing how divided pixels v and divided print pixels V are generated from the first print data W1.

As shown in FIG. 10, the target pixel Q1 is divided in the main scanning direction, and divided pixels v11, v21 are generated. The target pixel Q2 is divided in the main scanning direction, and divided pixels v12, v22 are generated. The target pixel Q3 is divided in the main scanning direction, and divided pixels v13, v23 are generated. The target pixel Q4 is divided in the main scanning direction, and divided pixels v14, v24 are generated. Hereinafter, the divided pixels v11, v12, v13, v14 are collectively referred to as "divided pixels v1". The divided pixels v21, v22, v23, v24 are collectively referred to as "divided pixels v2". The divided pixels v1, v2 are collectively referred to as "divided pixels v".

As shown in FIG. 7, next, the CPU 71 identifies, of the divided pixels v1, v2 generated by dividing the target pixel Q, the divided pixel v that is closer to the print pixel P adjacent to the target pixel Q in the main scanning direction as the divided print pixel V (S19). The divided print pixel V is the divided pixel v in which a dot is formed.

In FIG. 10, since the print pixel P3 is adjacent to the target pixel Q1 on the other side in the main scanning direction, of the divided pixels v11, v21, the divided pixel v21 adjacent to the print pixel P3 is identified as the divided print pixel V21. Since the print pixel P2 is adjacent to the target pixel Q2 on the one side in the main scanning direction, of the divided pixels v12, v22, the divided pixel v12 adjacent to the print pixel P2 is identified as the divided print pixel V12. Since the print pixel P5 is adjacent to the target pixel Q3 on the one side in the main scanning direction, of the divided pixels v13, v23, the divided pixel v23 adjacent to the print pixel P5 is identified as the divided print pixel V23. Since the print pixel P4 is adjacent to the target pixel Q4 on the other side in the main scanning direction, of the divided pixels v14, v24, the divided pixel v14 adjacent to the print pixel P4 is identified as the divided print pixel V14.

As shown in FIG. 7, the CPU 71 identifies the second print image G2 (see FIG. 6) obtained by adding the divided print pixel V identified in S19 to the print pixel P of the first print image G1 (S21). The CPU 71 generates the second print data W2 for printing the second print image G2 (S23), and stores the second print data W2 in the storage unit 72 (S23).

The CPU 71 drives the motor 36 to start rotating the platen roller 11 and the transport roller 12. Accordingly, the CPU 71 starts transporting the thermal tape M fed from the cassette 6 (S25).

The CPU 71 controls the electric power supplied to the heating element F of the thermal head 15 via the driver 73 based on the second print data W2 generated in S23. Accordingly, the CPU 71 performs the printing operation. The details are as follows.

When the CPU 71 causes the heating element F to generate heat at a position where the print pixel P in the second print image G2 is provided in the thermal tape M (S27: YES), the CPU 71 controls the driver 73 such that a value of the electric power supplied to the heating element F by the driver 73 is a first value T1 (S29). When the CPU 71 causes the heating element F to generate heat at a position where the target pixel Q in the second print image G2 is provided in the thermal tape M (S27: NO, S31: YES), the CPU 71 controls the driver 73 such that the value of the electric power supplied to the heating element F by the driver 73 is a second value T2 smaller than the first value T1 (S33). Here, both the first value T1 and the second value T2 are larger than the predetermined value Th, which is a threshold value of the electric power supplied to the heating element F when the thermal tape M is colored.

On the other hand, the CPU 71 controls the driver 73 such that the heating element F does not generate heat at a position where the non-print pixel q is provided in the thermal tape M (S31: NO, S35).

The CPU 71 determines whether printing based on the second print data W2 has been completed (S37). When the CPU 71 determines that the printing is not completed (S37: NO), the CPU 71 returns the processing to S27 and repeats the processing in S27 to S35.

Figure 11:
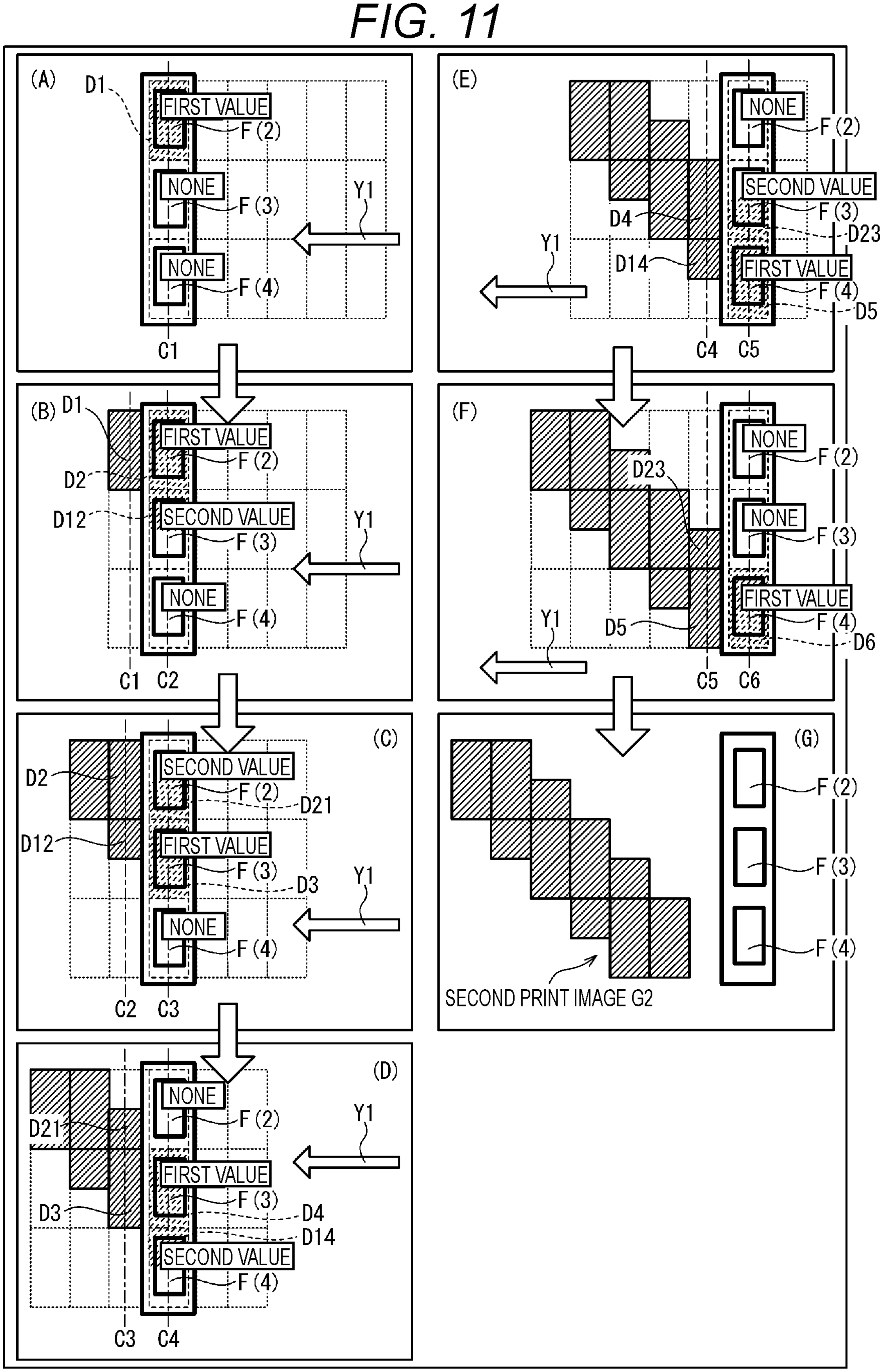
FIG. 11 illustrates how a second print image G2 is printed.

A case in which the second print image G2 is printed on the thermal tape M based on the second print data W2 (see FIG. 6) will be specifically described with reference to FIG. 11.

First, information on the row C1 (see FIG. 6) of the second print data W2 is referred to, and the print pixel P1 in the second print image G2 is extracted. As shown in (A) of FIG. 11, the electric power of the first value T1 is supplied to the heating element F(2) located at a position corresponding to the extracted print pixel P1 in the thermal tape M. Accordingly, the thermal tape M develops color, and a dot D1 is formed.

Next, the information on the row C2 (see FIG. 6) of the second print data W2 is referred to, and the print pixel P2 and the target pixel Q2 in the second print image G2 are extracted. As shown in (B) of FIG. 11, the electric power of the first value T1 is supplied to the heating element F(2) located at a position corresponding to the extracted print pixel P2 in the thermal tape M. Accordingly, the thermal tape M develops color, and a dot D2 is formed. The electric power of the second value T2 is supplied to the heating element F(3) located at a position corresponding to the extracted target pixel Q2 in the thermal tape M. Accordingly, the thermal tape M develops color, and a dot D12 is formed. Since the second value T2 is smaller than the first value T1, the length of the dot D12 formed at the position corresponding to the target pixel Q2 in the thermal tape M in the main scanning direction is smaller than the lengths of the dots D1, D2.

The position at which the dot D2 is formed is adjacent to the dot D1. Therefore, in consideration of heat for forming the dot D1, the value of the electric power supplied to the heating element F(2) in order to form the dot D2 may be smaller than the value of the electric power supplied to the heating element F(2) in order to form the dot D1. In this case, the value of the electric power supplied to the heating element F(2) in order to form the dot D2 may be calculated by heat accumulation calculation based on the electric power supplied to the heating element F(2) in order to form the dot D1.

The heat of the heating element F(2) to which the electric power of the first value T1 is supplied in order to form the dot D2 affects a region of the thermal tape M that is heated by the heat generated by the heating element F(3). Therefore, the dot D12 formed by coloring the thermal tape M due to the heat generated by the heating element F(3) is connected to the dot D2, and no gap is generated therebetween. On the other hand, since the heating element F(4) adjacent to the heating element F(3) on a side opposite to the heating element F(2) does not generate heat, the dot D12 does not spread to a side opposite to the dot D2. Accordingly, the dot D12 is formed at a position close to the dot D2 with respect to a center of the position corresponding to the target pixel Q2 in the main scanning direction.

Next, the information on the row C3 (see FIG. 6) of the second print data W2 is referred to, and the print pixel P3 and the target pixel Q1 in the second print image G2 are extracted. As shown in (C) of FIG. 11, the electric power of the first value T1 is supplied to the heating element F(3) located at a position corresponding to the extracted print pixel P3 in the thermal tape M. Accordingly, the thermal tape M develops color, and a dot D3 is formed. The electric power of the second value T2 is supplied to the heating element F(2) located at a position corresponding to the extracted target pixel Q1 in the thermal tape M. Accordingly, the thermal tape M develops color, and a dot D21 is formed. Since the second value T2 is smaller than the first value T1, the length of the dot D21 formed at the position corresponding to the target pixel Q3 in the thermal tape M in the main scanning direction is smaller than the lengths of the dots D1 to D3.

The heat of the heating element F(3) to which the electric power of the first value T1 is supplied in order to form the dot D3 affects a region of the thermal tape M that is heated by the heat generated by the heating element F(2). Therefore, the dot D21 formed by coloring the thermal tape M due to the heat generated by the heating element F(2) is connected to the dot D3, and no gap is generated therebetween. On the other hand, since the heating element F(1) (see FIG. 3) adjacent to the heating element F(2) on a side opposite to the heating element F(3) does not generate heat, the dot D21 does not spread to a side opposite to the dot D3. Accordingly, the dot D21 is formed at a position close to the dot D3 with respect to a center of the position corresponding to the target pixel Q3 in the main scanning direction.

Next, the information on the row C4 (see FIG. 6) of the second print data W2 is referred to, and the print pixel P4 and the target pixel Q4 in the second print image G2 are extracted. As shown in (D) of FIG. 11, the electric power of the first value T1 is supplied to the heating element F(3) located at a position corresponding to the extracted print pixel P4 in the thermal tape M. Accordingly, the thermal tape M develops color, and a dot D4 is formed. The electric power of the second value T2 is supplied to the heating element F(4) located at a position corresponding to the extracted target pixel Q4 in the thermal tape M. Accordingly, the thermal tape M develops color, and a dot D14 is formed. The length of the dot D14 in the main scanning direction is smaller than the lengths of the dots D1 to D4. The dot D14 is connected to the dot D4, and is formed at a position close to the dot D4 with respect to a center of the position corresponding to the target pixel Q4 in the main scanning direction.

Next, the information on the row C5 (see FIG. 6) of the second print data W2 is referred to, and the print pixel P5 and the target pixel Q3 in the second print image G2 are extracted. As shown in (E) of FIG. 11, the electric power of the first value T1 is supplied to the heating element F(4) located at a position corresponding to the extracted print pixel P5 in the thermal tape M. Accordingly, the thermal tape M develops color, and a dot D5 is formed. The electric power of the second value T2 is supplied to the heating element F(3) located at a position corresponding to the extracted target pixel Q3 in the thermal tape M. Accordingly, the thermal tape M develops color, and a dot D23 is formed. The length of the dot D23 in the main scanning direction is smaller than the lengths of the dots D1 to D5. The dot D23 is connected to the dot D5, and is formed at a position close to the dot D5 with respect to a center of the position corresponding to the target pixel Q3 in the main scanning direction.

Next, information on the row C6 (see FIG. 6) of the second print data W2 is referred to, and the print pixel P6 in the second print image G2 is extracted. As shown in (F) of FIG. 11, the electric power of the first value T1 is supplied to the heating element F(4) located at a position corresponding to the extracted print pixel P6 in the thermal tape M. Accordingly, the thermal tape M develops color, and a dot D6 is formed.

As described above, as shown in (G) of FIG. 11, the second print image G2 including the dots D1 to D6, D21, D12, D23, D14 (see (A) to (F) of FIG. 11) is printed on the thermal tape M.

As shown in FIG. 7, when the CPU 71 determines that the printing based on the second print data W2 has been completed (S37: YES), the CPU 71 stops the driving of the motor 36 and terminates the rotation of the platen roller 11 and the transport roller 12. Accordingly, the CPU 71 stops the transport of the thermal tape M (S39). The CPU 71 terminates the main processing.

Operation and Effect According to Present Embodiment

In the printer 1, the length of the dot D formed at the position corresponding to the target pixel Q in the thermal tape M in the main scanning direction may be made smaller than the length of the dot D formed at the position corresponding to the print pixel P in the main scanning direction. Accordingly, since the printer 1 may increase the density of the dot D formed on the thermal tape M in the main scanning direction, a high-quality print image may be printed on the thermal tape M.

Regardless of which of the divided pixels v1, v2 obtained by dividing the target pixel Q into two in the main scanning direction is set as the divided print pixel V, the printer 1 uniformly supplies the electric power of the second value T2 to the heating element F to form the dot D at the position corresponding to the target pixel Q in the thermal tape M. Since the dot D formed in this case is connected to the other dot D adjacent thereto in the main scanning direction, the second print image G2 in which the jaggies seen in the outline portion of the first print image G1 are smoothed is printed on the thermal tape M. Therefore, since the printer 1 may form the dot D having a high density in the main scanning direction on the thermal tape M by simple control, the processing load of the CPU 71 may be reduced.

Based on the second print data W2, the printer 1 sets, as the first value T1, the value of the electric power supplied to the heating element F in order to cause the heating element F to generate heat at a position where the print pixel P in the second print image G2 is provided in the thermal tape M. On the other hand, the printer 1 sets, as the second value T2, the electric power supplied to the heating element F in order to cause the heating element F to generate heat at a position where the target pixel Q including the divided print pixel V in the second print image G2 is provided in the thermal tape M. Accordingly, the printer 1 may easily determine the position corresponding to the target pixel Q, supply the electric power of the second value T2 to the heating element F, and form the dot D at the position corresponding to the divided print pixel V.

The pixels of the first print data W1 are generated by dividing the original pixel (see FIG. 5) having the same length in the main scanning direction and the sub-scanning direction into two in the sub-scanning direction. Therefore, the length of the pixel in the first print data W1 in the sub-scanning direction is ½ of the length in the main scanning direction. Accordingly, since the printer 1 may increase the dot density in the sub-scanning direction, a high-quality print image with higher resolution may be printed on the thermal tape M.

The printer 1 sets, as the first value T1, the electric power supplied to the heating element F in order to cause the heating element F to generate heat at the position corresponding to the print pixel P in the thermal tape M, and sets, as the second value T2, the electric power supplied to the heating element F in order to cause the heating element F to generate heat at the position corresponding to the target pixel Q in the thermal tape M. Both the first value T1 and the second value T2 are larger than the predetermined value Th, which is a minimum value of the electric power required to form a dot on the thermal tape M. That is, when the electric power of the second value T2 is supplied to the heating element F, the thermal tape M develops color without being affected by the heat generated by the adjacent heating element F, and forms the dot D. Therefore, the printer 1 may appropriately form the dot D at the position corresponding to the divided print pixel V.

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below

MODIFICATION

Main processing according to a modification will be described with reference to FIG. 12. In the main processing according to the modification, S57 to S65 are executed instead of S27 to S35 in FIG. 7. Since the other processing is the same as the main processing shown in FIG. 7, the description thereof will be omitted.

Figure 12:
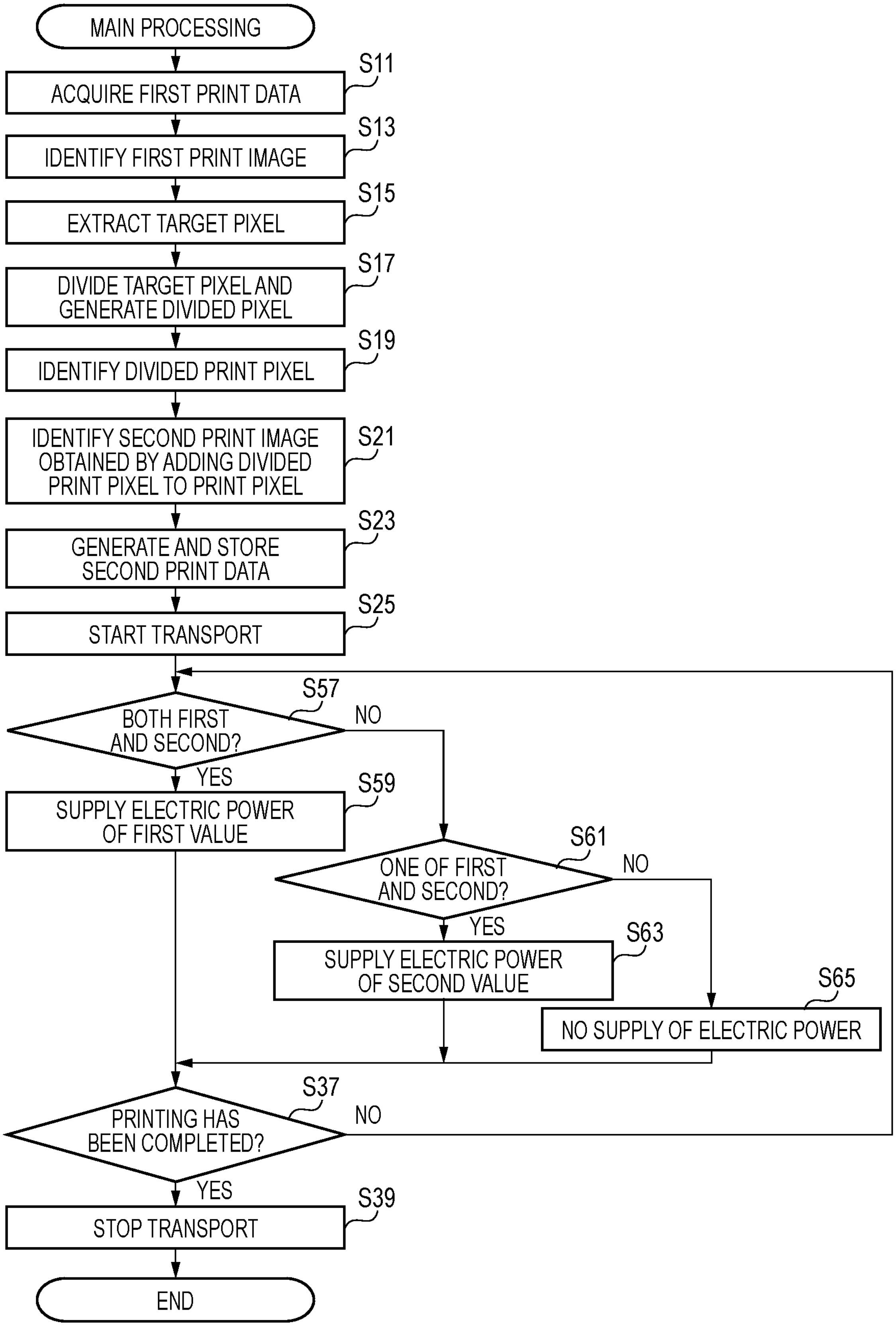
FIG. 12 is a flowchart of main processing according to a modification.

As shown in FIG. 12, the CPU 71 controls the electric power supplied to the heating element F of the thermal head 15 via the driver 73 based on the second print data W2 generated in S23. Accordingly, the CPU 71 performs the printing operation. The details are as follows.

The CPU 71 identifies the first print image G1 including the print pixel P based on the first print data W1 stored in the storage unit 72. The CPU 71 identifies, based on the second print data W2 stored in the storage unit 72, the second print image G2 in which the divided print pixel V is added to the print pixel P.

The CPU 71 identifies a part where both the first print image G1 and the second print image G2 are provided as the position of the print pixel P. When the CPU 71 causes the heating element F to generate heat at the position corresponding to the identified print pixel P in the thermal tape M (S57: YES), the CPU 71 controls the driver 73 such that the value of the electric power supplied to the heating element F by the driver 73 is the first value T1 (S59).

The CPU 71 identifies a part where only the second print image G2 is provided and where the first print image G1 is not provided as the position of the divided print pixel V. When the CPU 71 causes the heating element F to generate heat at the position corresponding to the target pixel Q including the identified divided print pixel V in the thermal tape M (S57: NO, S61: YES), the CPU 71 controls the driver 73 such that the value of the electric power supplied to the heating element F by the driver 73 is the second value T2 smaller than the first value T1 (S63).

The CPU 71 identifies a part where neither the first print image G1 nor the second print image G2 is provided as the position of the non-print pixel q. The CPU 71 controls the driver 73 such that the heating element F does not generate heat at the position corresponding to the identified non-print pixel q in the thermal tape M (S61: NO, S65).

The CPU 71 determines whether the printing based on the second print data W2 has been completed (S37). When the CPU 71 determines that the printing is not completed (S37: NO), the CPU 71 returns the processing to S57 and repeats the processing in S57 to S65.

According to the modification, the printer 1 may easily determine the position corresponding to the target pixel Q, supply the electric power of the second value T2 to the heating element F, and form the dot D at the position corresponding to the divided print pixel V.

Other Modifications

Figure 13:
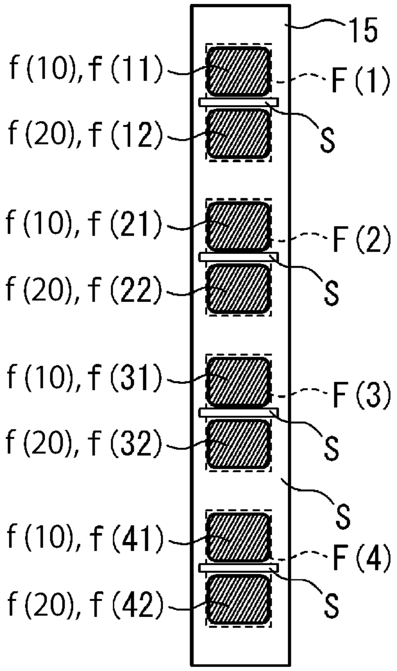
FIG. 13 is a diagram showing a thermal head 15 according to the modification.

Each heating element F of the thermal head 15 may include two heating bodies that form one dot on the thermal tape M by generating heat. For example, as shown in FIG. 13, the heating element F(1) may include heating bodies f(11), f(12). The heating element F(2) may include heating bodies f(21), f(22). The heating element F(3) may include heating bodies f(31), f(32). The heating element F(4) may include heating bodies f(41), f(42). Hereinafter, the heating bodies f(11), f(21), f(31), f(41) are collectively referred to as a “heating body f(10)”. The heating bodies f(12), f(22), f(32), f(42) are collectively referred to as a “heating body f(20)”.

The heating bodies f(10), f(20) of the heating elements F are arranged in the main scanning direction. A separator S is provided between the heating bodies f(10), f(20). The heating bodies f(10), f(20) are separated from each other in the main scanning direction.

The printer 1 causes each of the heating bodies f(10), f(20) of the heating element F to generate heat at the position corresponding to the target pixel Q in the thermal tape M. In this case, the position to which heat is applied from the heating bodies f(10), f(20) in the thermal tape M approaches the position of the print pixel P adjacent to a central part of the target pixel Q in the main scanning direction on one side or the other side in the main scanning direction. Therefore, the heat of the heating element F to which the electric power of the first value T1 is supplied in order to form the dot D at the position corresponding to the print pixel P is more likely to affect a region of the thermal tape M that is heated by the heat generated by the heating bodies f(10), f(20) to which the electric power of the second value T2 is supplied in order to form the dot D at the position corresponding to the print pixel Q. Therefore, the dot D formed at the position corresponding to the target pixel Q is more likely to connect with the adjacent dot D, in other words, the dot D formed at the position corresponding to the print pixel P. Therefore, the printer 1 may easily form the dot D at the position corresponding to the divided print pixel V in the thermal tape M.

The printer 1 generates the divided pixels v1, v2 by dividing the target pixel Q into two in the main scanning direction. On the other hand, the printer 1 may generate n divided pixels v by dividing the target pixel Q into n (n is an integer equal to or greater than 2) in the main scanning direction. That is, the number of the divided pixels v generated by dividing the target pixel Q is not limited to two, and may be three or more. As the number of n increases, the dot density in the main scanning direction may be increased. On the other hand, as in the above-described embodiment, by setting the value of n to 2 and dividing the target pixel Q into two in the main scanning direction, it is possible to increase the dot density in the main scanning direction while preventing an increase in processing load of the CPU 71.

Figure 14:
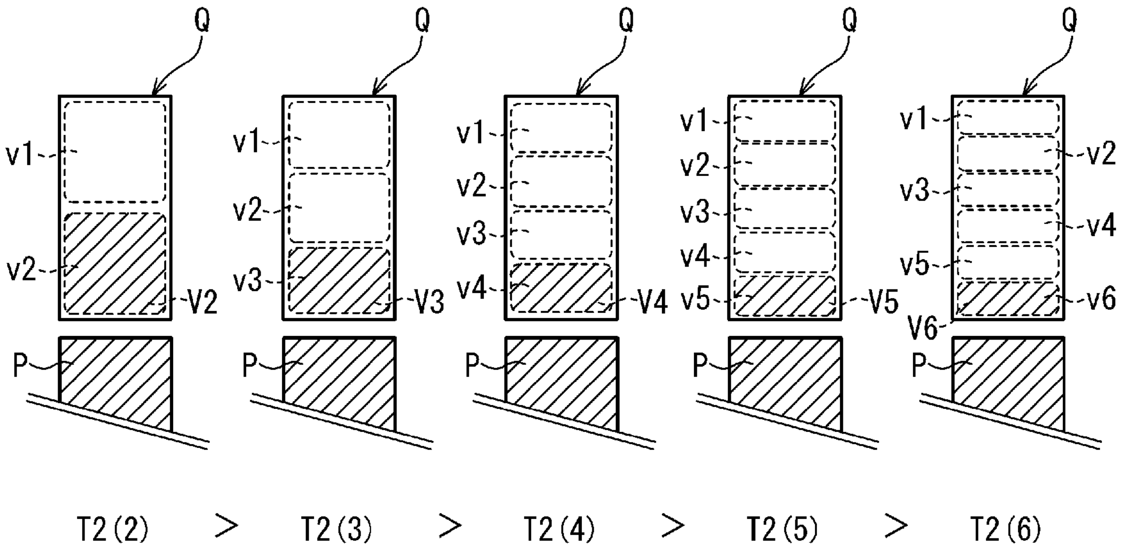
FIG. 14 illustrate comparison of the target pixels Q in which the numbers of the divided pixels v are different.

For example, as shown in FIG. 14, the printer 1 may generate the divided pixel v by dividing the target pixel Q into any of two to six. Among the divided pixels v, one divided pixel v that is closest to the print pixel P adjacent to the target pixel Q in the main scanning direction may be set as the divided print pixel V. In this case, the second value T2, which is the value of the electric power supplied to cause the heating element F to generate heat at the position corresponding to the target pixel Q in the thermal tape M, may be smaller as the number n of the divided pixels v is larger. For example, when the second value T2 in a case in which the target pixel Q is divided into n and the divided pixel v is generated is denoted as a second value T2(*n*), as shown in FIG. 14, the relationship of T2(2)>T2(3)>T2(4)>T2(5)>T2(6) may be satisfied. Accordingly, the printer 1 may appropriately form the dot D at the position corresponding to the divided print pixel V in the thermal tape M.

Figure 15:
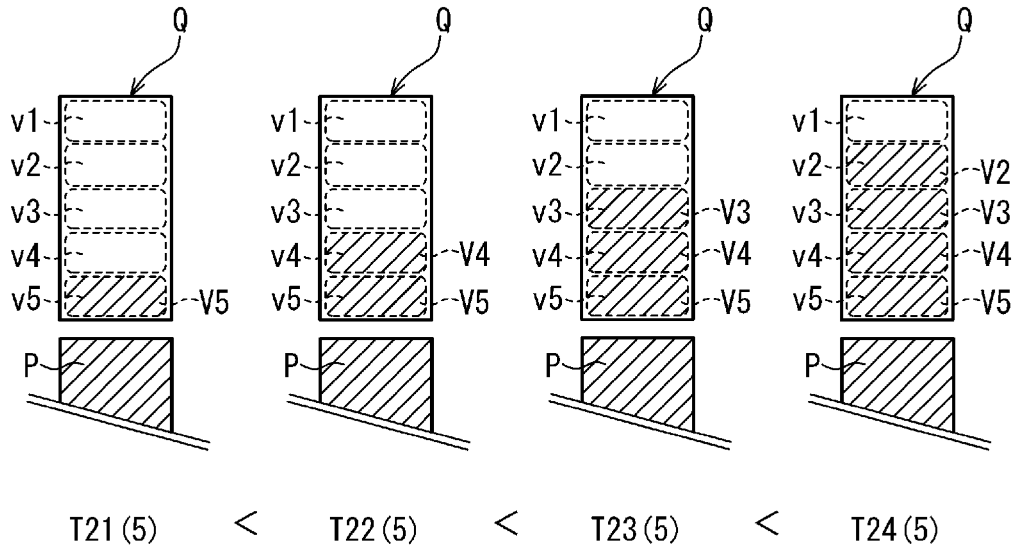
FIG. 15 illustrate comparison of the target pixels Q in which the numbers of the divided print pixels V are different.

The printer 1 may use, as the divided print pixels V, two or more of the divided pixels v in order from a side that is closest to the print pixel P adjacent to the target pixel Q in the main scanning direction. For example, as shown in FIG. 15, when the target pixel Q is divided into five and the divided pixel v is generated, the number of divided print pixels V may be any of one to four.

In the above description, the second value T2, which is the value of the electric power supplied to cause the heating element F to generate heat at the position corresponding to the target pixel Q in the thermal tape M, may be larger as the number of the divided print pixels V is larger. For example, when the second value T2 in a case in which x (x is any integer of 1 to 5) divided pixels v in order from the side closest to the print pixel P adjacent to the target pixel Q in the main scanning direction are set as the divided print pixels V is denoted as the second value 2x(5), as shown in FIG. 15, the relationship of T21(5)<T22(5)<T23(5)<T24(5)<T25(5) may be satisfied. Accordingly, the printer 1 may appropriately form the dot D at the position corresponding to the divided print pixel V in the thermal tape M.

The pixels of the first print data W1 are generated by dividing an original pixel having the same length in the main scanning direction and the sub-scanning direction into m (m is an integer equal to or greater than 2) in the sub-scanning direction. That is, the pixels of the first print data W1 may be generated by dividing the original pixel into three or more in the sub-scanning direction. In this case, the length of each pixel in the first print data W1 in the sub-scanning direction may be 1/m of the length in the main scanning direction. On the other hand, the lengths of the pixels of the first print data W1 in the main scanning direction and the sub-scanning direction may be the same. That is, the first print data W1 may include the original pixel as it is.

The second value T2 may be smaller than the predetermined value Th. In this case, when the electric power of the second value T2 is supplied in order to cause the heating element F to generate heat at the position corresponding to the target pixel Q in the thermal tape M, the thermal tape M may be colored by being affected by the heat corresponding to the heat generation of the heating element F adjacent to the individual heating element F, and the dot D may be formed.

The printer 1 may set, as the first value T1, the value of the electric power supplied to the heating element F in order to cause the heating element F to generate heat at a position corresponding to a print pixel Pp, which is a part of the print pixel P in the thermal tape M, and may set, as the second value T2, the value of the electric power supplied to the heating element F in order to cause the heating element F to generate heat at a position corresponding to a print pixel Pq, which is a part of the print pixel P other than the print pixel Pp part. Accordingly, the printer 1 may divide, in the main scanning direction, the dot D formed at the position corresponding to the print pixel Pq in the thermal tape M. Accordingly, since the printer 1 may increase the density of the dot D formed at the position corresponding to the print pixel Pq in the thermal tape M in the main scanning direction, a high-quality print image with higher resolution may be printed on the thermal tape M.

The printer 1 may divide the dot D formed on the thermal tape M in the sub-scanning direction by making the cycle of causing the heating element F to generate heat by supplying the electric power to the heating element F shorter than t/2. In this case, since the printer 1 may increase the dot density in the sub-scanning direction, a high-quality print image with higher resolution may be printed on the thermal tape M.

The printer 1 may control the voltage applied to the heating element F of the thermal head 15 to be the first value T1 or the second value T2. The printer 1 may control the amount of electric power applied to the heating element F of the thermal head 15 to be the first value T1 or the second value T2.

OTHERS

The printer 1 is an example of a "printing apparatus" according to the present disclosure. The thermal tape M is an example of a "print medium" according to the present disclosure. The platen roller 11 and the transport roller 12 are an example of a "moving mechanism" according to the present disclosure. The CPU 71 is an example of a "controller" according to the present disclosure. The CPU 71 that performs the processing in S11 to S23 is an example of "generation processing" according to the present disclosure. The CPU 71 that performs the processing in S25 to S35 is an example of "control processing" according to the present disclosure. The processing in S11 to S23 is an example of a "generation step" according to the present disclosure. The processing in S25 to S35 is an example of a "control step" according to the present disclosure.

What is claimed is:

1. A printing apparatus comprising:

a thermal head in which a plurality of heating elements is arranged in a main scanning direction;

a moving mechanism configured to relatively move a print medium with respect to the thermal head in a sub-scanning direction crossing the main scanning direction;

a controller configured to control the thermal head and the moving mechanism; and a storage unit configured to store first print data in which pixels are arranged in the main scanning direction and the sub-scanning direction, the pixels including print pixels indicating pixels with which corresponding dots are formed on the print medium by heat generated by the heating elements and non-print pixels with which no dot is formed on the print medium, the first print data being for printing a first print image represented by the print pixels, wherein the controller is configured to execute generation processing of generating second print data based on the first print data stored in the storage unit, the generation processing including:

extracting, from the non-print pixels, a target pixel to which one of the print pixels is adjacent on one side or the other side in the sub-scanning direction and to which one of the print pixels is adjacent on one side or the other side in the main scanning direction;

generating n divided pixels by dividing the extracted target pixel into n in the main scanning direction, n being an integer equal to or greater than 2;

identifying a second print image formed of the print pixels and at least one divided print pixel with which corresponding dot is formed on the print medium and chosen from the n divided pixels in order of closeness to one of the print pixels adjacent to the extracted target pixel in the main scanning direction, and generating the second print data for printing the second print image, and control processing of controlling the thermal head and the moving mechanism based on at least the second print data generated by the generation processing, the control processing including:

setting, as a first value, a value of energy applied to the heating element in order to cause the heating element to generate heat at a position corresponding to one of the print pixels on the print medium; and setting, as a second value, a value of energy smaller than the first value and applied to the heating element in order to cause the heating element to generate heat at a position corresponding to the target pixel on the print medium.

2. The printing apparatus according to claim 1, wherein, in the control processing, the second value becomes larger as the number of the divided pixels gets larger in a state where n is kept stable.

3. The printing apparatus according to claim 1, wherein, in the control processing, the second value becomes smaller as n is larger in a state where the number of the divided print pixels is kept stable.

4. The printing apparatus according to claim 1, wherein the control processing further includes, based on the second print data:

setting, as the first value, a value of energy applied to the heating element in order to cause the heating element to generate heat at a position where one of the print pixels in the second print image is provided on the print medium; and setting, as the second value, a value of energy applied to the heating element in order to cause the heating element to generate heat at a position where the target pixel including the divided print pixel in the second print image is provided on the print medium.

5. The printing apparatus according to claim 1, wherein the control processing further includes, based on the first print data and the second print data:

setting, as the first value, a value of energy applied to the heating element in order to cause the heating element to generate heat at a position where the first print image and the second print image are provided on the print medium, and setting, as the second value, a value of energy applied to the heating element in order to cause the heating element to generate heat at a position where only the second print image is provided on the print medium.

6. The printing apparatus according to claim 1, wherein each of the pixels of the first print data is generated by dividing each of original pixels having the same length in the main scanning direction and the sub-scanning direction into m in the sub-scanning direction, m being an integer equal to or greater than 2, and wherein a length of each of the pixels of the first print data in the sub-scanning direction is 1/m of a length of each of the pixels of the first print data in the main scanning direction.

7. The printing apparatus according to claim 1, wherein n is 2.

8. The printing apparatus according to claim 1, wherein the heating element includes two heating bodies separated in the main scanning direction and each configured to form one dot on the print medium by heat generation.

9. The printing apparatus according to claim 1, wherein, in a case where energy equal to or greater than a predetermined value is applied to the heating element to generate heat, a dot is formed on the print medium, wherein, in a case where energy less than the predetermined value is applied to the heating element to generate heat, no dot is formed on the print medium, and wherein the second value is equal to or greater than the predetermined value.

10. The printing apparatus according to claim 1, wherein the controller is configured to divide, in the main scanning direction, a dot formed at the position corresponding to a second part of the print pixels other than a first part of the print pixels on the print medium, by:

setting, as the first value, a value of energy applied to the heating element in order to cause the heating element to generate heat at a position corresponding to the first part on the print medium; and settings, as the second value, a value of energy applied to the heating element in order to cause the heating element to generate heat at a position corresponding to the second part on the print pixels.

11. The printing apparatus according to claim 1, wherein the controller is configured to divide, in the sub-scanning direction, a dot formed on the print medium, by shorten a cycle of the heating element generating heat by applying energy to the heating element.

12. The printing apparatus according to claim 1, wherein the main scanning direction is perpendicular to the sub-scanning direction.

13. A printing method comprising:

generating second print data based on first print data in which pixels are arranged in a main scanning direction and a sub-scanning direction crossing the main scanning direction, the pixel including print pixels indicating pixels with which corresponding dots are formed on a print medium by heat generated by a heating element of a thermal head in which a plurality of heating elements are arranged in the main scanning direction, the non-print pixels indicating pixels with which no dot is formed on the print medium, the first print data being for printing a first print image represented by the print pixels; and controlling the thermal head and a moving mechanism, based on at least the second print data generated in the generating, configured to relatively move the print medium with respect to the thermal head in the sub-scanning direction, wherein the generating includes:

extracting, from the non-print pixels, a target pixel to which one of the print pixels is adjacent on one side or the other side in the sub-scanning direction and to which one of the print pixels is adjacent on one side or the other side in the main scanning direction;

generating n divided pixels by dividing the extracted target pixel into n in the main scanning direction, n being an integer equal to or greater than 2;

identifying a second print image formed of the print pixels and at least one divided print pixel with which corresponding dot is formed on the print medium and chosen from the n divided pixels in order of closeness to one of the print pixels adjacent to the extracted target pixel in the main scanning direction; and generating the second print data for printing the second print image, and wherein the controlling includes:

setting, as a first value, a value of energy applied to the heating element in order to cause the heating element to generate heat at a position corresponding to one of the print pixels on the print medium; and setting, as a second value, a value of energy smaller than the first value and applied to the heating element in order to cause the heating element to generate heat at a position corresponding to the target pixel on the print medium.

14. The printing apparatus according to claim 13, wherein the main scanning direction is perpendicular to the sub-scanning direction.

15. A non-transitory computer readable medium storing a program causing a computer to execute a process for performing printing on a print medium, the process comprising:

generating second print data based on first print data in which pixels are arranged in a main scanning direction and a sub-scanning direction crossing the main scanning direction, the pixel including print pixels indicating pixels with which corresponding dots are formed on the print medium by heat generated by a heating element of a thermal head in which a plurality of heating elements are arranged in the main scanning direction, the non-print pixels indicating pixels with which no dot is formed on the print medium, the first print data being for printing a first print image represented by the print pixels; and controlling the thermal head and a moving mechanism, based on at least the second print data generated in the generating, configured to relatively move the print medium with respect to the thermal head in the sub-scanning direction, wherein the generating includes:

extracting, from the non-print pixels, a target pixel to which one of the print pixels is adjacent on one side or the other side in the sub-scanning direction and to which one of the print pixels is adjacent on one side or the other side in the main scanning direction;

generating n divided pixels by dividing the extracted target pixel into n in the main scanning direction, n being an integer equal to or greater than 2;

identifying a second print image formed of the print pixels and at least one divided print pixel with which corresponding dot is formed on the print medium and chosen from the n divided pixels in order of closeness to one of the print pixels adjacent to the extracted target pixel in the main scanning direction; and generating the second print data for printing the second print image, and wherein the controlling includes:

setting, as a first value, a value of energy applied to the heating element in order to cause the heating element to generate heat at a position corresponding to one of the print pixels on the print medium; and setting, as a second value, a value of energy smaller than the first value and applied to the heating element in order to cause the heating element to generate heat at a position corresponding to the target pixel on the print medium.

16. The printing apparatus according to claim 15, wherein the main scanning direction is perpendicular to the sub-scanning direction.

* * * * *